United States Patent
Els et al.

(10) Patent No.: US 10,002,368 B1
(45) Date of Patent: Jun. 19, 2018

(54) SYSTEM AND METHOD FOR RECOMMENDING ADVERTISEMENT PLACEMENTS ONLINE IN A REAL-TIME BIDDING ENVIRONMENT

(71) Applicant: MaxPoint Interactive, Inc., Morrisville, NC (US)

(72) Inventors: Michael Els, Durham, NC (US); Igor Postelnik, Austin, TX (US)

(73) Assignee: MAXPOINT INTERACTIVE, INC., Morrisville, NC (US)

( * ) Notice: Subject to any disclaimer, the term of this patent is extended or adjusted under 35 U.S.C. 154(b) by 513 days.

(21) Appl. No.: 13/831,252

(22) Filed: Mar. 14, 2013

Related U.S. Application Data

(60) Provisional application No. 61/621,379, filed on Apr. 6, 2012.

(51) Int. Cl.
*G06Q 30/02* (2012.01)

(52) U.S. Cl.
CPC ................................ *G06Q 30/0243* (2013.01)

(58) Field of Classification Search
CPC .................................... G06Q 30/0207–30/0277
See application file for complete search history.

(56) References Cited

U.S. PATENT DOCUMENTS

| | | | |
|---|---|---|---|
| 8,234,170 B2 | 7/2012 | Kassakian et al. | 705/14.71 |
| 8,438,184 B1 | 5/2013 | Wang et al. | 707/780 |
| 8,554,602 B1 | 10/2013 | Zohar et al. | 705/7.33 |
| 8,799,062 B1 | 8/2014 | Epperson et al. | 705/14.1 |
| 2003/0110171 A1 | 6/2003 | Ozer et al. | |
| 2003/0149937 A1 | 8/2003 | Mcelfresh et al. | 715/210 |
| 2003/0195832 A1 | 10/2003 | Cao et al. | 705/37 |
| 2006/0106710 A1 | 5/2006 | Meek et al. | 705/37 |
| 2006/0212350 A1* | 9/2006 | Ellis | G06Q 30/0242 705/14.41 |
| 2007/0143171 A1 | 6/2007 | Boyd et al. | 705/306 |

(Continued)

OTHER PUBLICATIONS

Ye Chen et al., Real Time Bidding Algorithms for Performance-Based Display Ad Allocation, Aug. 21, 2011, Association for Computing Machinery.*

(Continued)

*Primary Examiner* — David J Stoltenberg
(74) *Attorney, Agent, or Firm* — Slayden Grubert Beard PLLC

(57) ABSTRACT

A method and system for recommending advertisement placements based on scoring is disclosed. According to one embodiment, a computer-implemented method comprises receiving a real-time bidding (RTB) request for placing an online advertisement campaign. For each of a plurality of advertisement placements, a performance score is determined based on an estimated feedback parameter. The estimated feedback parameter is calculated from observed performance of the online advertisement campaign and similarity measures of other online advertisement campaigns. A first advertisement placement having a higher performance score is given more weight than a second advertisement placement having a lower performance score. A set of advertisement placements having their performance scores equal to or greater than the target rating is selected from the plurality of advertisement placements and provided for advertisement placements.

23 Claims, 12 Drawing Sheets

(56) References Cited

U.S. PATENT DOCUMENTS

| | | | |
|---|---|---|---|
| 2007/0174114 A1* | 7/2007 | Bigby et al. | 705/14 |
| 2008/0103898 A1 | 5/2008 | Flake et al. | 705/14.41 |
| 2008/0243824 A1 | 10/2008 | Riise et al. | |
| 2008/0249832 A1* | 10/2008 | Richardson et al. | 705/10 |
| 2009/0132348 A1 | 5/2009 | Bria et al. | 705/35 |
| 2010/0138271 A1 | 6/2010 | Henkin et al. | 705/14.54 |
| 2010/0198679 A1* | 8/2010 | Kassakian et al. | 705/14.42 |
| 2010/0228636 A1 | 9/2010 | Silverman et al. | 705/14.72 |
| 2010/0250332 A1* | 9/2010 | Ghosh | G06Q 30/02 705/14.41 |
| 2010/0250362 A1 | 9/2010 | Bax et al. | 705/14.43 |
| 2010/0262455 A1* | 10/2010 | Karlsson | G06Q 30/02 705/14.45 |
| 2010/0262497 A1 | 10/2010 | Karlsson | 705/14.71 |
| 2010/0317420 A1 | 12/2010 | Hoffberg | 463/1 |
| 2010/0324974 A1 | 12/2010 | D'ambrosio et al. | 705/310 |
| 2011/0015988 A1* | 1/2011 | Wright | G06Q 30/02 705/14.42 |
| 2011/0035276 A1 | 2/2011 | Ghosh et al. | 705/14.46 |
| 2011/0040613 A1* | 2/2011 | Simmons | G06Q 30/02 705/14.42 |
| 2011/0040635 A1 | 2/2011 | Simmons et al. | 705/14.71 |
| 2011/0040636 A1* | 2/2011 | Simmons | G06Q 30/02 705/14.71 |
| 2011/0153449 A1 | 6/2011 | Hite | 705/26.3 |
| 2011/0166942 A1* | 7/2011 | Vassilvitskii et al. | 705/14.71 |
| 2011/0173126 A1* | 7/2011 | Knapp | G06Q 20/3829 705/71 |
| 2011/0178840 A1 | 7/2011 | Ravichandran | 705/7.29 |
| 2011/0191169 A1* | 8/2011 | Cui | G06Q 30/0247 705/14.46 |
| 2011/0191170 A1* | 8/2011 | Zhang | G06Q 30/0247 705/14.46 |
| 2011/0196733 A1* | 8/2011 | Li | G06Q 30/02 705/14.42 |
| 2011/0196747 A1* | 8/2011 | Karidi | G06Q 30/02 705/14.71 |
| 2011/0218955 A1 | 9/2011 | Tang et al. | 706/52 |
| 2011/0231264 A1 | 9/2011 | Dilling et al. | 705/14.71 |
| 2011/0258036 A1 | 10/2011 | Ioffe et al. | 705/14.43 |
| 2011/0258041 A1 | 10/2011 | Ioffe et al. | 705/14.46 |
| 2011/0258056 A1 | 10/2011 | Ioffe et al. | 705/14.73 |
| 2011/0276392 A1 | 11/2011 | Vaver et al. | 705/14.43 |
| 2011/0313851 A1 | 12/2011 | Athey et al. | 705/14.46 |
| 2012/0030034 A1 | 2/2012 | Knapp et al. | 705/14.71 |
| 2012/0041816 A1 | 2/2012 | Buchalter | 705/14.41 |
| 2012/0053991 A1 | 3/2012 | Shimizu et al. | 705/7.34 |
| 2012/0066066 A1 | 3/2012 | Jain et al. | 705/14.48 |
| 2012/0089455 A1 | 4/2012 | Belani et al. | 705/14.44 |
| 2012/0150626 A1* | 6/2012 | Zhang | G06Q 30/0243 705/14.42 |
| 2012/0158456 A1 | 6/2012 | Wang et al. | 705/7.31 |
| 2012/0158490 A1 | 6/2012 | Neumeyer et al. | 705/14.46 |
| 2012/0221409 A1* | 8/2012 | Grebeck et al. | 705/14.46 |
| 2012/0245990 A1 | 9/2012 | Agarwal | 705/14.25 |
| 2012/0253928 A1 | 10/2012 | Jackson et al. | 705/14.49 |
| 2012/0310729 A1* | 12/2012 | Dalto | G06Q 30/02 705/14.43 |
| 2012/0323674 A1* | 12/2012 | Simmons | G06Q 30/02 705/14.41 |
| 2013/0018722 A1 | 1/2013 | Libby | 705/14.46 |
| 2013/0066725 A1 | 3/2013 | Umeda | 705/14.66 |
| 2013/0198011 A1 | 8/2013 | Corner et al. | 705/14.71 |
| 2013/0268374 A1* | 10/2013 | Papineni | G06Q 30/02 705/14.71 |
| 2013/0346218 A1* | 12/2013 | Liu | G06Q 30/02 705/14.71 |
| 2014/0032306 A1 | 1/2014 | Sukornyk et al. | 705/14.43 |
| 2014/0040015 A1 | 2/2014 | Haley et al. | 705/14.45 |
| 2014/0046777 A1* | 2/2014 | Markey | G06Q 30/0269 705/14.66 |
| 2014/0089106 A1 | 3/2014 | Jordan et al. | 705/14.71 |
| 2014/0229273 A1 | 8/2014 | Garcia-Martinez et al. | 705/14.46 |
| 2016/0162955 A1 | 6/2016 | O'kelley et al. | 705/14.71 |

OTHER PUBLICATIONS

United States Final Office Action, U.S. Appl. No. 13/672,698, 10 pages, dated Nov. 7, 2014.

Perlich, Claudia et al., "Bid Optimizing and Inventory Scoring in Targeted Online Advertising," Media6Degrees, 9 pages, Aug. 12, 2012.

United States Non-Final Office Action, U.S. Appl. No. 13/672,698, 16 pages, dated May 27, 2014.

Lo, Andrew et al., "Econometric Models of Limit-Order Executions," Masschussetts Institute of Technology, 59 pages, Mar. 22, 200.

United States Non-Final Office Action, U.S. Appl. No. 13/831,307, 32 pages, dated May 12, 2015.

United States Non-Final Office Action, U.S. Appl. No. 13/857,123, 17 pages, dated Jul. 13, 2015.

Athey, Susan et al., "Nonparametric Approaches to Auctions," 125 pages, May 6, 2005.

United States Final Office Action, U.S. Appl. No. 13/857,123, 33 pages, dated Jan. 20, 2016.

U.S. Final Office Action, U.S. Appl. No. 14/711,130, 27 pages, dated Oct. 18, 2017.

Schnedler, Wendelin, "Likelihood Estimation of Censored Random Vectors," Alfred-Weber-Institut, Heidelberg University, Dept. of Economics, 25 pages, Apr. 11, 2005.

Debruyne, M. et al., "Censored Depth Quantiles," Computational Statistics & Data Analysis, vol. 52, pp. 1604-1614, May 13, 2007.

Wu, Wush Chi-Hsuan et al., "Predicting Winning Price in Real Time Bidding with Censored Data," Association for Computing Machinery, KDD'15, 10 pages, Aug. 10, 2015.

U.S. Notice of Allowance, U.S. Appl. No. 13/857,123, 14 pages, dated Mar. 28, 2017.

U.S. Non-Final Office Action, U.S. Appl. No. 14/711,130, 40 pages, dated Apr. 12, 2017.

U.S. Non-Final Office Action, U.S. Appl. No. 14/825,749, 30 pages, dated Feb. 12, 2018.

* cited by examiner

SYSTEM AND METHOD FOR RECOMMENDING ADVERTISEMENT PLACEMENTS ONLINE IN A REAL-TIME BIDDING ENVIRONMENT

CROSS-REFERENCE TO RELATED APPLICATIONS

This application claims priority to U.S. Provisional Application Ser. No. 61/621,379, entitled "System and Method For Optimizing Real-Time Bidding On Online Advertisement Placements" and filed on Apr. 6, 2012, the disclosure of which is hereby incorporated by reference in its entirety.

FIELD

The present disclosure relates in general to the field of computer software and systems, and in particular, to a system and method for recommending advertisement placements online in a real-time bidding environment.

BACKGROUND

Online advertisement placements generally refer to the slots or space on the pages of a website that are available for displaying advertisements along with its content. Advertisers typically bid on these advertisement placements that are made available through real-time bidding (RTB) exchanges such as AdX, Admeld, Pubmatic, etc.

From a mechanical perspective, this requires a bidding server to have computer hardware linked to the RTB exchanges. The bidding server then receives bid requests via the RTB exchanges. A bid request occurs when a user/internet surfer visits a website/publisher that is selling their advertisement space on an RTB exchange. Upon receiving a bid request, the bidding server has a very short period of time within to respond to this request (generally around 50-100 ms or less). Since this bid response needs to occur in a very short period of time, it is difficult to run large scale models to predict what advertisements to buy and what price to pay for them.

Traditionally, an advertiser manually made simple static rules to be carried out at bid time. The advertiser observes and determines which domains were available on the exchanges. The advertiser selects the domains to bid on by entering them into an excel document. Then, after several days, the advertiser receives a report and visually weighs each domain against its click-through-rate ("CTR") to decide if the advertisement performed adequately. The CTR refers to the percentage of times users click on the advertisements given the number of times the advertisements are displayed ("impressions"). The advertiser removes poor performing domains and adds new domains. This traditional approach is largely a process of trial and error that relied to a great extent on human memory and human judgment in an effort to meet CTR goals and to ensure enough domains are chosen so that the campaign meets the periodic impression quota. Therefore, this traditional approach is more prone to human errors. Furthermore, because domains are generally bid on with a single static price, advertisers often pay too much for advertisement placements or do not win more valuable bids at the set price.

SUMMARY

A method and system for recommending advertisement placements based on scoring is disclosed. According to one embodiment, a computer-implemented method comprises receiving a real-time bidding (RTB) request for placing an online advertisement campaign. For each of a plurality of advertisement placements, a performance score is determined based on an estimated feedback parameter. The estimated feedback parameter is calculated from observed performance of the online advertisement campaign and similarity measures of other online advertisement campaigns. A first advertisement placement having a higher performance score is given more weight than a second advertisement placement having a lower performance score. A set of advertisement placements having their performance scores equal to or greater than the target rating is selected from the plurality of advertisement placements and provided for advertisement placements.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
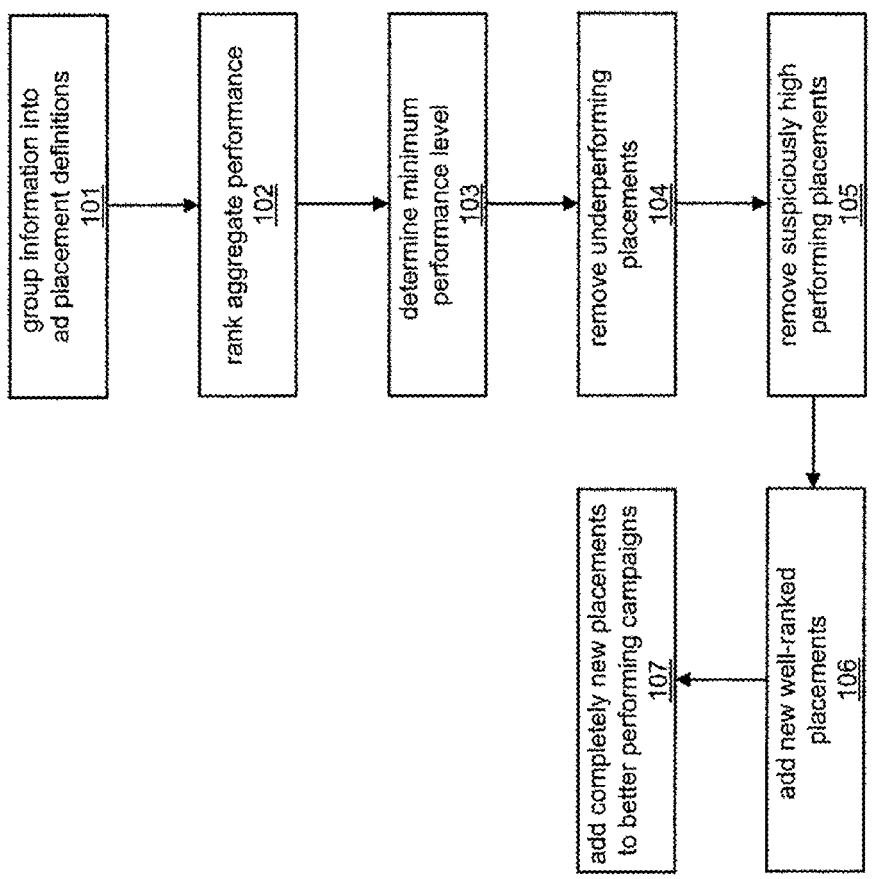
FIG. 1 is a flow-chart that illustrates a process for selecting advertisement placements based on popularity, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for recommending advertisement placements based on scoring is disclosed. According to one embodiment, a computer-implemented method comprises receiving a real-time bidding (RTB) request for placing an online advertisement campaign. For each of a plurality of advertisement placements, a performance score is determined based on an estimated feedback parameter. The estimated feedback parameter is calculated from observed performance of the online advertisement campaign and similarity measures of other online advertisement campaigns. A first advertisement placement having a higher performance score is given more weight than a second advertisement placement having a lower performance score. A set of advertisement placements having their performance scores equal to or greater than the target rating is selected from the plurality of advertisement placements and provided for advertisement placements.

It is an objective of the present system and method to provide a mechanism to consider multiple large data sets in the decision processing in such a way that can be acted upon in a time frame required for real-time bidding.

The present system and method allows advertisers to automatically and smartly bid on advertisement requests on RTB exchanges in an optimal manner while reaching a target goal of an advertising campaign. Moreover, the present system determines how best to buy advertisement placements in an RTB environment in a manner that maximizes the campaign goals at market efficient prices and that meets the required impression quota. Campaign goals may take the form of: a particular demographic audience, a desired CTR, a desired cost per click, a video view rate, a number of online purchases/actions, a desired cost per purchase/action, offline sales, or maximize the rate at which any target event occurs. It is noted that the present system and method refers specifically to CTR, but it may be applied to any other feedback parameters than CTR.

Defining Advertisement Placements

Typically, the number of unique advertisement requests that are found in an RTB is in the order of billions. In an effort to efficiently manage the massive amount of information on RTB exchanges, it is advantageous to create a structure to classify the billions of unique advertisement placements into fewer, optimizable components.

Figure 8:
FIG. 8 illustrates an example of an advertisement placement, according to one embodiment.

According to one embodiment, advertisement placements may be grouped by segments. For instance, an advertisement placement may be defined using the following structure: {RTB exchange, Domain, Segment1, Segment2, . . . , SegmentN, Ad Size, Ad position}. To illustrate, consider the advertisement placement shown in FIG. 8 for the web address http://www.foxnews.com/politics/2012/03/07/justice-department-threatens-apple-publishers-with-lawsuits-over-alleged-e-book/. Applying this structure, the advertisement placement may be defined as follows:

Exchange: AdX
Domain: foxnews.com
Segment1: politics
Segment2: 2012
Segment3: 03
Segment4: 07
Segment5: justice-department-threatens-apple-publishers-with-lawsuits-over-alleged-e-book
Ad Size: 728×90
Ad Position: Above the fold Grouping advertisement placements into different advertisement segments allows probabilistic statements to be made because probabilistic statements require a sample. Observing and evaluating individual URLs as placements by themselves does not allow easily for statements regarding what works according to any metric. By grouping URLs together into advertisement placements, useful statistical inferences are made.

Statistically, the rarer an event, a larger sample size is needed to be able to accurately measure its efficacy. Campaign goals (metrics) are rare events that vary greatly. An advertisement placement should be defined in such a way that the sample size is sufficiently large to make probabilistic statements. For instance, consider CTR goals for display and video advertisements. Because clicks are a much rarer event on display advertisements than they are on video advertisements (e.g., 0.1% vs 2% CTRs on average), the above advertisement placement may be defined more broadly for a display campaign:

Exchange: AdX
Domain: foxnews.com
Ad Size: 728×90
Ad Position: Above the fold

While for a video campaign, the above advertisement placement may be defined more narrowly:

Exchange: AdX
Domain: foxnews.com
Segment1: politics
Segment2: 2012
Ad Size: video ad
Ad Position: Above the fold Thus, defining an advertisement placement may include the number of impressions that have been served on the placement, and how rare are the occurrences of the event that is being optimized. Generally, the more information that is available for an advertisement placement or the more common the occurrences of an event are, the more granularly the advertisement placement may be defined. Advertisement placements may be defined or redefined on the fly for every campaign and every performance metric.

The end result is a dynamic dataset that evolves as advertisements are served. This dataset is unique and dynamically changes every time the data is processed. The present system and method groups URLs into placements as granularly as it can, while still retaining sufficient information for inference. The granularity depends on:

the efficacy of the placement; the higher the success rate, the fewer impressions are needed for inference.

the similarity of the placement; if the placement performs on par with those around it, then it does not get broken out into a separate placement. Those placements that perform above or below the expectation get broken into different placements.

Placement Recommendation

After defining the advertisement placement set for each campaign, the next step is to score and rank all the advertisement placements for each campaign given the knowledge of all placement performance across all known campaigns including previous and on-going campaigns.

FIG. 1 is a flow-chart that illustrates a process for selecting advertisement placements based on popularity, according to one embodiment. Starting at 101, impression and various other forms of information from all known campaigns are grouped together into advertisement placement definitions. Other forms of information may, for instance, include cross campaign placement comparisons that reveal whether certain advertisement sizes are more effective than others. It may also include domain categories that are used to manipulate scoring and rankings and to help the system learn whether some content categories consistently outperform others.

The advertisement placements are then ranked based on their aggregate performance scores across all the previous campaigns. At 102, all advertisement placements served within each campaign are scored and ranked. At 103, minimum and maximum desired performance levels for the advertisement placements for each on-going or currently-active campaign are determined. Thus, each campaign is associated with its own minimum and maximum levels. At 104, advertisement placements from each on-going campaign that do not meet a minimum performance level are removed. At 105, advertisement placements that have suspiciously high performance metrics are also removed as they may be indicative of non-human activity, such as those performed by spiders/crawlers that generate fake clicks. At 106, new advertisement placements are added to each on-going campaign based on their aggregate performance score (determined at 101). At 107, some proportion of placements that are completely new to the system (e.g., no performance information from previous campaigns) may be added to the better performing, on-going campaigns. This allows the learning of performance information regarding speculative advertisement placements.

In addition to the selection process illustrated in FIG. 1, each campaign may be associated with specified "white lists" or "black lists" that may affect the scoring and ranking of advertisement placements. A white list may refer to a list of domains that are adequate for advertisement placements. This could be a list from a client, an internal list, or a list based on domain categories. A black list may refer to a list of sites that are excluded from the server because they that have deemed undesirable for a campaign. These lists may be applied to all optimizations.

Figure 2:
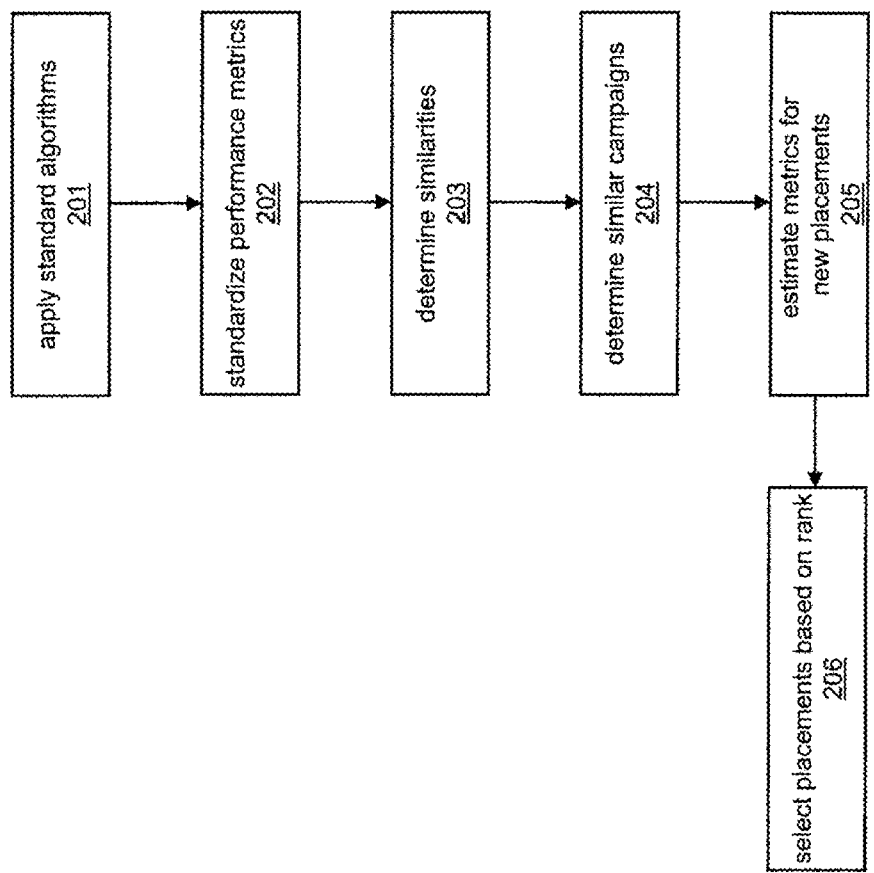
FIG. 2 is a flow-chart that illustrates an exemplary collaborative filtering process for selecting advertisement placements, according to one embodiment.

While the process of FIG. 1 selects advertisement placements based on their performance/popularity, a collaborative filtering process is also contemplated (this is not restricted to collaborative filtering, any matrix factorization or other recommendation technique is implied throughout the document where "collaborative filtering" is used). FIG. 2 is a flow-chart that illustrates an exemplary collaborative filtering process for selecting advertisement placements, according to one embodiment. Starting at 201, the performance of each advertisement placement is determined based on standard user-based recommendation (e.g., each campaign is treated as a user and each advertisement placement is treated as an item). At 202, the performance metrics are standardized for each campaign. At 203, Pearson (or other) similarity measures may be used to determine which campaigns are similar based on how they performed on like placements with like performance metrics. At 204, for each campaign, a number of other campaigns (e.g., 10) that are most similar to it are determined. Then, at 205, performance metrics for new placements may be estimated based on a weighted average of how similar campaigns performed on those placements. The weights may be based on how similar the other campaign is to the campaign of interest and how many impressions were served to each placement, and how certain the system is that the observed performance metric resembles the truth. Finally, at 206, the desired advertisement placements for a campaign may be selected based on their score or rank (e.g., based on weighted scores of observed performance or from performance scores of similar campaigns for each placement) and estimated performance metrics.

Figure 3:
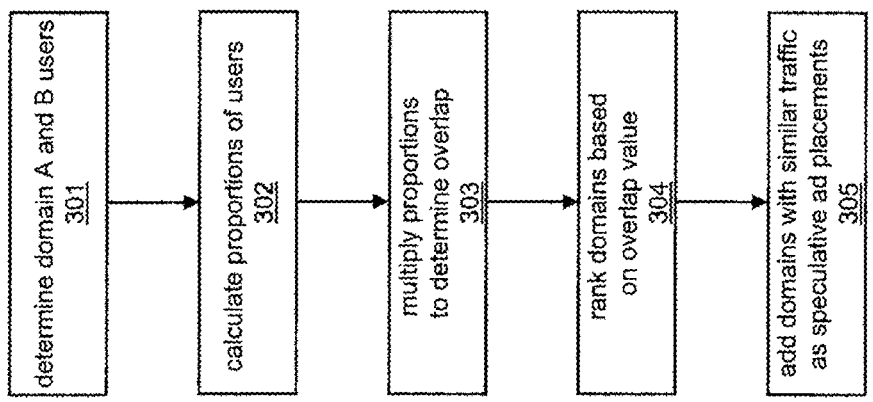
FIG. 3 is a flow-chart that illustrates an advertisement placement selection process based on similar user traffic, according to one embodiment.

In addition to the selection processes of FIGS. 1 and 2, it may also be desirable to select advertisement placements that are similar to top rated advertisement placements through similar user traffic. FIG. 3 is a flow-chart that illustrates an advertisement placement selection process based on similar user traffic, according to one embodiment. Starting at 301, users which have visited domain A (e.g., domain with top rated advertisement placements) and users which have visited domain B are determined. At 302, the proportion of users that visited domain A that also visited domain B is calculated (e.g., $$\left(e.g., \frac{A \cap B}{B}\right).$$

). Similarly, the proportion of users that visited domain B that also visited domain A is calculated (e.g., $$\left(e.g., \frac{A \cap B}{A}\right).$$

). At 303, these two values are multiplied together to define a similarity measure that equals "1" if the audience for both domains is exactly the same and "0" if domains A and B have no overlapping users. Using this measure, at 304, all other domains are ranked by how similar they are in terms of users to the top performing domain for any campaign. At 305, domains with similar traffic to a top performing domain are added as speculative advertisement placements. These advertisement placements may be biased towards the low volume domains because generally they will have a more precise audience.

Although the processes illustrated by FIGS. 1-3 have been described independently, it is contemplated that they may be used in combination with one another, such as in a tiered system, to facilitate the selection of advertisement placements for campaigns. Another process that may be applied to further facilitate the selection of advertisement placements is feature comparison across advertisement sizes, domain categories (e.g., news, sport, entertainment, technology, etc.), and campaign categories (e.g., Auto, CPG, insurance, etc.).

Figure 4:
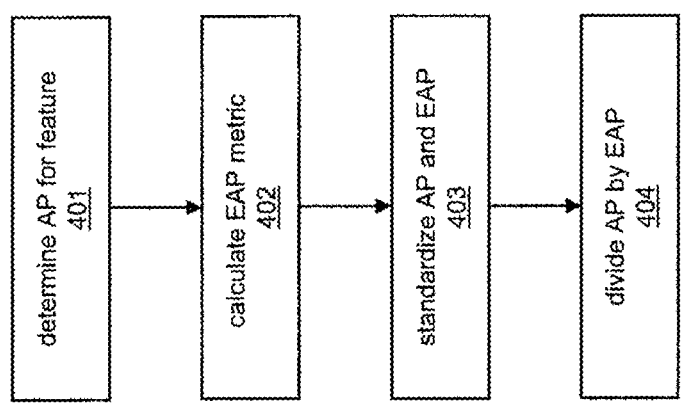
FIG. 4 is a flow-chart that illustrates an exemplary process for feature comparison for advertisement size categories, according to one embodiment.

FIG. 4 is a flow-chart that illustrates an exemplary process for feature comparison for advertisement size categories, according to one embodiment. Starting at 401, the aggregate performance ("AP") of advertisement placements by advertisement size is determined for a given campaign. At 402, the expected aggregate performance ("EAP") for each advertisement size across all other campaigns is calculated. The expected aggregate performance provides a measure of how it should have performed. At 403, both the values AP and EAP, found in 401 and 402, respectively, are standardized so that they are directly comparable. Finally, at 404, by taking the standardized AP value and dividing by the standardized EAP value, the system measures the difference between the actual performance by advertisement size and the expected performance. For instance, a value of "1" indicates that it is performing as expected and a value of "1.2" indicates that the advertisement size is performing 20% better than expect. The advertisement size is sent in the bid request. It represents the size of the advertisement slot available on the given URL.

While the above process of FIG. 4 is illustrated with respect to advertisement size comparison, it can be applied across any feature set. The result may also be averaged across all feature sets, for instance, to an adjustment centered around "1." The results may further be averaged by placement and multiplied by the estimated rating from the user-based recommender model of FIG. 2 to get an updated score estimate.

One issue that may be associated with selecting advertisement placements is a cold start problem. This problem refers to the situation in which campaign performance information over several advertisement placements may be unavailable for making an accurate recommendation for advertisement placement. One method to resolve this issue is to use item popularity to create a starting list. Another method is to pick the top N placements from all campaigns to ensure a good mix of placements and allow a campaign to select the best neighborhood of similar campaigns as fast as possible. Additionally, feature information based on campaign category may also be included. For instance, if the new campaign is an insurance-based campaign, placements which worked best for other insurance-based campaigns may be determined. This may be accomplished using the same methods as described above without providing similarity data, but rather grouping campaigns or taking the top N placements out of a category. A mixture of these methods may be applied to help solve the cold start problem.

Digital Zip/User Targeting

Another aspect of the present system and method is grouping Internet Protocols (IPs) and IP ranges into clusters based on geographic location known as Digital Zips (DZs). This allows the optimization of DZs or IPs based on some performance metric, similar to how advertisement placements are optimized as described above. For instance, in the optimization of DZs or IPs, each DZ is treated as an item and each campaign as a user. This allows the system to use a similar user-based collaborative filtering approach described above. Furthermore, a similarity technique similar to the technique illustrated in FIG. 3 may be applied to find new DZs that are similar to good performing DZs based on traffic patterns.

Traditionally, advertisers target entire countries or large metropolitan areas. The present recommender system breaks these larger areas into much smaller neighborhoods for efficient targeting. The recommender system uses offline data such as census data, sales data and map the data to geographic areas to recommend good performing DZs or DZs that are expected to perform well for advertising.

As a campaign progresses, the recommender system receives performance feedback as to how DZs are performing. Performance feedback can be either sales or any online metrics such as click through rates. Performance feedback allows the recommender system to algorithmically learn and monitor the performance of geographic areas and when necessary to suggest stop advertising as well as making recommendations to new DZs to try for advertising.

DZ information can be layered and adjusted for spatial correlation using formal spatial models. When targeting areas to serve advertisements, a subset of available DZs may be chosen instead of all the available DZs. This allows the identification of DZs in the subset that perform well. Geographic neighbors to DZs that perform well are also more likely to perform well. Using standard spatial models, campaign performance may be estimated across the entire geographic space that are of interest for serving. Such standard spatial models include spatial Durbin model (SDM), spatial error model (SEM), spatial autoregressive model (SAR), conditional autoregressive model (CAR), and K-nearest neighbors methods. This way new DZs may be better selected, and poor performers may be thrown out. Such standard spatial models, for example, include spatial Durbin model (SDM), spatial error model (SEM), spatial autoregressive model, or the like.

This method can easily be combined with the user-based method. For example, performance correlations of each DZ may be estimated, standardized around "1," and then multiplied by the estimate score.

Price Optimization

Another aspect of the present system and method is price optimization. The RTB environment generally operates using a second price auction system. Advertisement placements have a clear price distribution around them and often have a price floor that moves over time. There is also a yearly price drift whereby placements increase in price over the year. There are also several cyclical components that occur within the year that affect all placements or some subset of placements (e.g. public holidays affect all placements while political events affect news and political placements only).

By looking at winning prices and win rates for placements that have been bid on, the present system estimates a price distribution that the market follows. The present system also estimates the price drift of this distribution over time.

Having estimated this distributional information, the system determines tradeoffs between lowering price and bid wins (impression volume). If the system observes that it is one of the highest bidders for an advertisement placement, then the system can lower its bid price substantially, lose marginal volume and have large decreases in the price paid. By doing this at scale across all placements, the system targets a desired win rate and given cost tailored to campaign volume, performance, and cost needs. The system determines tradeoffs between winning bid price and volume.

When there are lots of available impressions for a given placement, the system can strategically move down the price curve and maintain the same level of performance by effectively only buying the cheapest advertisements needed to meet the campaign's goals for that particular advertisement placement. Under some circumstances we have much more advertisement placements are available for purchase than we would like. Under these circumstances we can strategically buy the cheapest impressions within all advertisement placements and thus maintain performance and impressions spread across the same number of placements. In this case, the system strategically buys the cheaper advertisements (at a lower price and thus lower win rate) while maintaining the performance.

In a given auction, there might be only one bidder. For all auctions there is also an unknown and randomly changing price floor. Under these circumstances, the winning bid is set by the only bidder, and the present system exploits and targets placements by lowering the bid price until it reaches the current price floor. If it starts to lose all the time, it will raise price again. This applies when there is only one bidder in a given auction. Under some circumstances, the system can predict quite accurately when this is the case. When there is only one bidder, the system determines bid price that reaches the cheapest win price (i.e., price floor). This holds performance and win rate constant while decreasing the cost significantly.

Pacing Optimization

Another aspect of the present system and method is pacing optimization. One of the significant challenges of achieving good campaign performance is correct pacing (hitting the daily impression/volume goal). Correct pacing also refers to using as few placements as possible so that only the very best placements are used. An optimal situation is where advertisements are served every minute of the day so that by the last minute of the day, the last few impressions that are needed to hit that days impression quota/goal are being served.

One method for pacing optimization is to observe how many impressions a campaign served, how many placements it used, and which hours of the day it served. Because very different impression volumes occur every hour of the day, the system normalizes these numbers to estimate a placement velocity. Placement velocity refers to the average number of impressions that a placement will see throughout the day for a given campaign with a static set of DZs and a known point in the price distribution. Based on the number of impressions needed in the day, the system uses placement velocity to estimate the number placements needed to reach that goal.

Another method for pacing optimization may offer better pacing control from a mechanical point view because some campaigns run with hourly impression quotas that aim to meet a day's impression quota. To maximize the minutes served in the day, the system estimates the number of placements to assign a campaign for the day. Now, under this embodiment, the system estimates the number of impressions to allocate to each hour so as to fill each hour of the day. This is done by iteratively moving impression quota from hours that do not meet their quota to hours that meet their quota too quickly.

Yet another method for pacing optimization is to dynamically change the number of placements that are bid on periodically to adjust for volume fluctuations throughout the day.

According to another embodiment, the present system re-weights hours to bias impressions towards better performing hours. To ensure smooth serving throughout the day, the system assigns more placements to better performing hours compared to poorer performing hours. Each hour of the day performs equally well. In other words, for hours that perform well, the system selects below average performing advertisement placements as they will now perform adequately. Whereas for poor performing hours, the system drops some better placements as they will perform below what is needed. The system can perform this process for the optimization of DZs, as well.

Mixed Optimization

Another aspect of the present system and method is to apply some or all of the optimization methods discussed above simultaneously instead of in a tiered process in order to achieve a target performance metric at an efficient price point. As an example, the system provides a clear measure of how effective each placement, DZ and hour is. The system creates a final score that is, for instance, a function of placement, DZ and hour.

The core idea here is that there are K dimensions for optimizing performance (e.g. placement, time, DZ, demographics/audience attributes, etc.). The system is able to score each dimension alone. The extension of mixed optimization is (for each bid request) to estimate 1 score that jointly considers all other scores. Thus, it is some function F(score1, score2, . . . , scoreK).

According to one embodiment, the system computes a multiplicative score where each dimension is centered around 1. If the system (e.g., during a bid on an RTB exchange) identifies a DZ having a score of 1.5, an advertisement placement having a score of 1.2, and an hour having a score of 0.8, the final score for a bid request would be 1.44. If the system is targeting bid requests with a score greater than 1, the system would bid on this item. If too few impressions are being won, the system may increase the bid price to a maximum acceptable point, or lower the target score iteratively until impressions are won at the desired rate to meet that daily impression quota.

According to one embodiment, the present system and method provides an opportunity for bidders to consider or buy a rather poor performing placement that would never previously have been considered. The present method and system allows the bidders to place advertisements in a prime hour in the high performing DZ, thus providing more choices to bid with an improved performance.

Binomial Estimation for Eliminating Placements

As explained above, grouping advertisement placements into different advertisement segments allows probabilistic statements to be made because probabilistic statements require a sample. The present system solves the problem of determining the size of the sample required to make a probabilistic statement that is statistically significant. For instance, if X clicks are observed given Y impressions for an advertisement placement, the system ensures that the observed CTR of the advertisement placement is outperforming a target CTR ("tCTR").

It has been observed that clicks can be modeled fairly accurately under a binomial assumption. The probability p of an impression being clicked by a user is the same for each impression in the same set of impressions. Under the binomial assumption and setting p=tCTR, the probability P that the observed CTR ("oCTR") is greater than the target CTR (e.g., outperforming target CTR) is calculated by:

$$P(oCTR > tCTR) = \sum_{i=k}^{n} \frac{n!}{(n-i)!i!}(p^i)((1-p)^{n-i}),$$

where n is the number of observed impressions and k is the number of observed clicks.

To ensure that the observed CTR is large enough to support, for instance, at least a 20% confidence level (p value) that the observed CTR is outperforming the target CTR for a given number of observed impressions n, the number of observed clicks k is to be determined. To solve for k using the equation above takes significant computational resources. A less computationally intensive way to solve for k is to implement a look up table. However, given that k needs to be calculated for thousands or even millions of advertisement placements, lookup tables would not be a practical solution.

Figure 5:
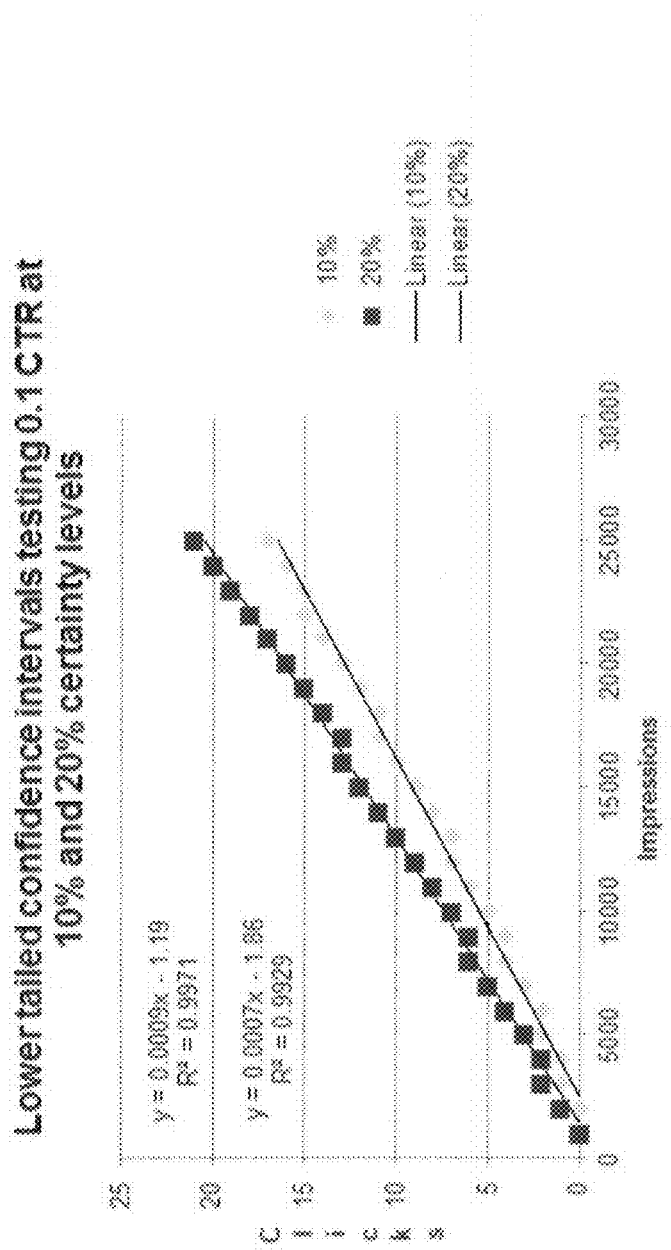
FIG. 5 illustrates an exemplary linear relationship for confidence levels 10% and 20% with tCTR=0.1%, according to one embodiment.

The present system and method provides efficient estimation for k without consuming much computational resources. The estimation for k is based on the observation that the number of observed clicks k for a given confidence level exhibits a linear relationship with respect to the number of impressions n. FIG. 5 illustrates an exemplary linear relationship for confidence levels 10% and 20% with tCTR=0.1%, according to one embodiment.

Figure 6:
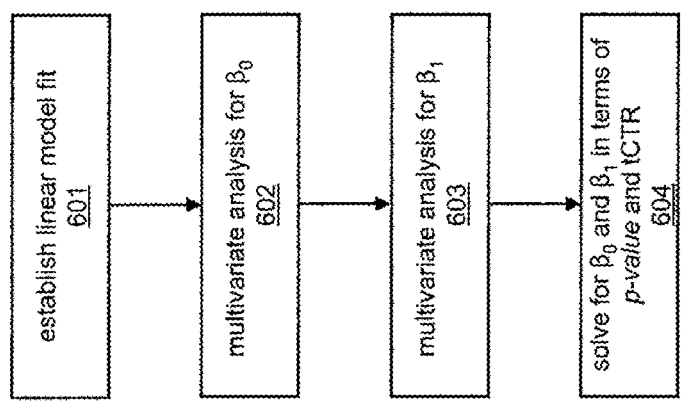
FIG. 6 illustrates a flow chart of an exemplary process for estimating the number of observed clicks for a given confidence level, according to one embodiment.

FIG. 6 illustrates a flow chart of an exemplary process for estimating the number of observed clicks k for a given confidence level, according to one embodiment. Starting at step 601, a linear model fit is established using data points calculated based on the equation for the probability P. The linear model fit yields coefficients $\beta_0$, $\beta_1$ and $\beta_2$.

$$\text{clicks confidence boundary} = \beta_0 + \beta_2 \times \sqrt{\text{impressions}} + \beta_2 \times \text{impressions}.$$

At step 602, a multivariate regression analysis is performed on the coefficient $\beta_0$ where the p-value and the tCTR are the explanation variables, where $\beta_0 = \text{tCTR} + p\text{value}$ $\beta_1 = \text{tCTR}$; and $\beta_2 = p\text{value}$.

During the multivariate regression analysis, more coefficient $\beta_0$ values may be calculated by varying p-value and tCTR. Step 601 is repeated to yield a set of coefficients $\beta_0$ and $\beta_1$. Similarly, at step 603, another multivariate regression analysis is performed on the coefficient $\beta_1$ where the p-value and the tCTR are the explanation variables using the set of coefficients $\beta_0$ that are already calculated at step 602. Finally, at step 604, coefficients $\beta_0$ and $\beta_1$ are solved for in terms of p-value and tCTR and plugged back into the linear model fit established in step 601.

It is noted that the above description encompassing FIGS. 5 and 6 illustrates one example according to one embodiment, and other variations to the multivariate regression analysis may be used without deviating from the scope of the present subject matter. For example, it is possible to define and approximate a four-dimensional space {p-value, CTR, impressions, clicks} or in terms of a binomial theory {p-value, p, trials, successes}. Instead of the discrete binomial equation to solve for confidence intervals, the four-dimensional space is approximated with a series of linear equations. When three of the four components of the four-dimensional space are known, it becomes a simple multiplication problem. As a result, given the three components including the desired target CTR, the level of confidence, and the number of impressions served, simple multiplication operations determine the minimum number of clicks needed for that target CTR to be true or better than the desired target CTR. Using these results, the present system decides with reasonable certainty when to stop bidding on a given placement based on the likelihood that its performance is below the desired target CTR for that campaign. When the system stops bidding, it would be better to start fresh bidding on a new placement that was chosen from the previously described estimation/recommendation system.

Figure 7:
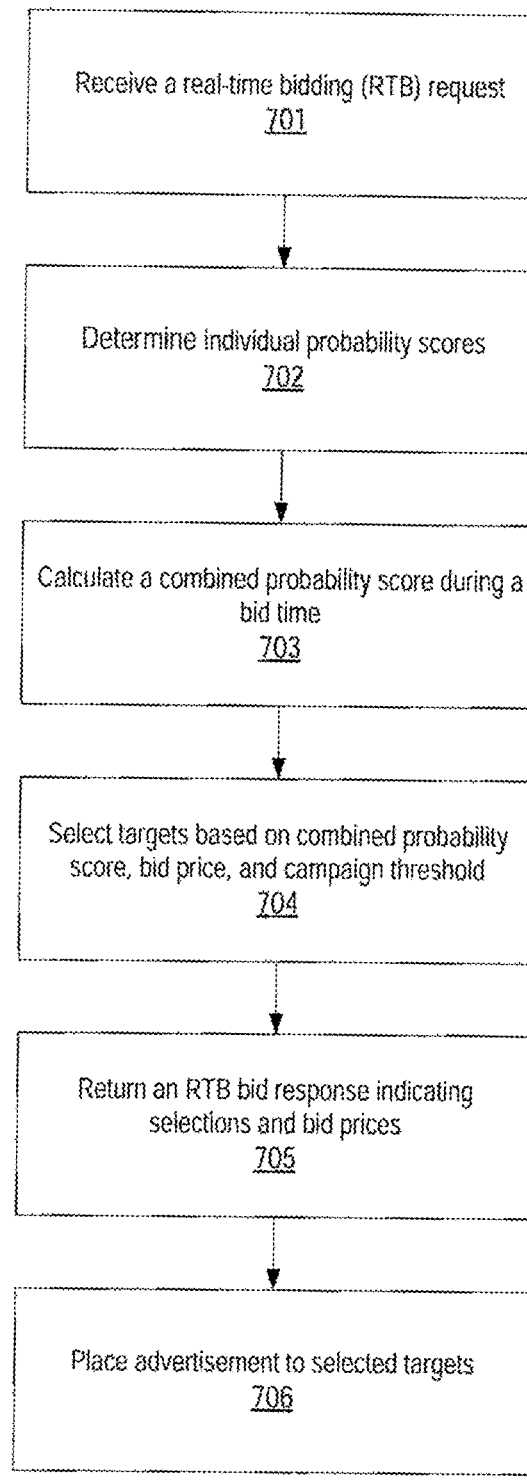
FIG. 7 illustrates a flow-chart of an exemplary process for calculating a combined probability score, according to one embodiment.

FIG. 7 illustrates a flow-chart of an exemplary process for calculating a combined probability score, according to one embodiment. An RTB system receives a real-time bidding (RTB) request from an advertisement exchange who desires to place an online advertisement campaign (701). The RTB system determines individual probability scores (702). During a bid time, when a target appears and/or becomes available for placing an impression for the campaign, the RTB system calculates a combined probability score (703). The RTB system then selects targets for placing an impression based on the combined probability score, the bid price, and the campaign threshold (704). The RTB system returns a RTB bid response to bidders with selections made and the bid prices (705). The RTB system finally places the impression to the available targets and updates the target count (706).

Recommender System and Placement Scoring

According to one embodiment, the present system and methods provides a recommender system that recommends advertisement placement to bid for an advertisement campaign every day based on the data collected from the advertisement campaign that was previously run and advertisement placements that are available on all exchanges. This advertisement placement recommendation relies on the statistically designed data sets. The advertisement placements may be divided into more meaningful buckets/groupings. More meaningful inference can be made by grouping a statistically meaningful number of impressions in a placement. URLs are grouped into placements in such a way that enough impressions are obtained for each placement to be able to conduct meaningful inference about its performance. The present recommender system predicts placement performance more accurately using noisier placement information than otherwise possible.

Figure 11:
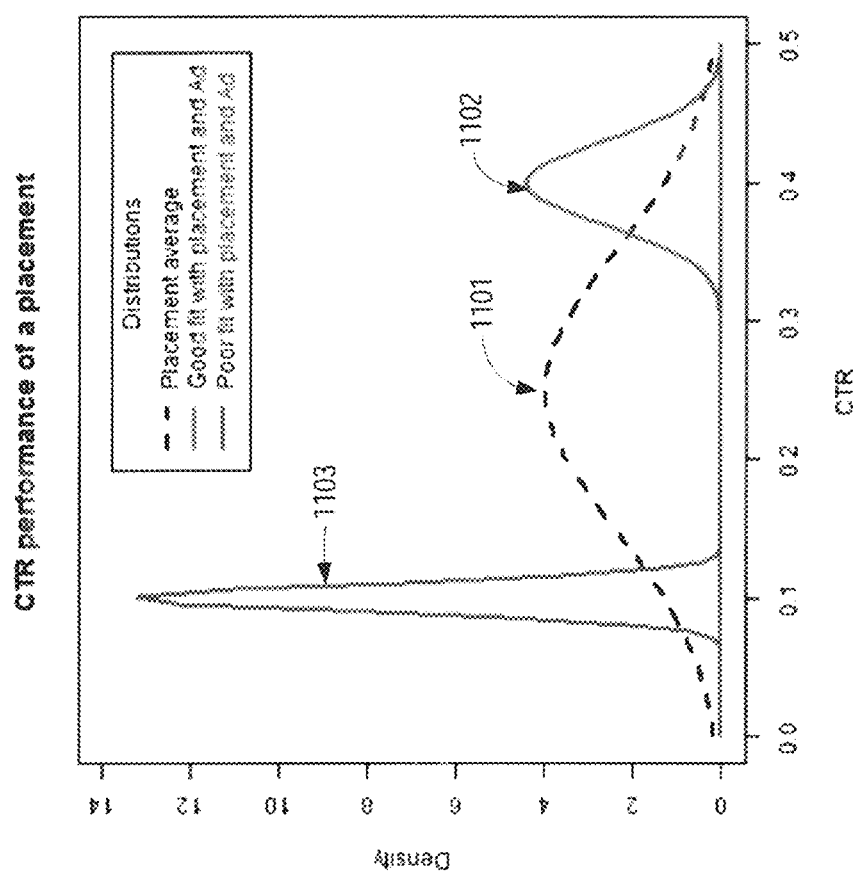
FIG. 11 illustrates exemplary cases with distributed CTR performance in an advertisement placement campaign, according to one embodiment.

FIG. 11 (not drawn to scale) illustrates exemplary cases with distributed CTR performance in an advertisement placement campaign, according to one embodiment. This example specifically refers to CTR, however it is understood that any feedback parameter can be used instead of CTR, for example, landing page hit rates, coupon download rates, purchase rates, signup rates, etc.

Several assumptions are made in the present recommender system. The first assumption is that any advertisement placement has an underlying average CTR. This implies that any advertisement being served has a CTR with a relatively wide distribution. This is represented by line 1101 in FIG. 11. The y-axis density is a standard measurement of a probability distribution.

The second assumption is that certain advertisement campaign has unknown compatibility or preference for placement. This implies that an advertisement being served gets a tighter CTR distribution, thus having a lower variance, specific to the ad. Such advertisement placements lie somewhere inside the average distribution of line 1101. Because each placement has a unique browsing audience, each advertisement resonates differently with the audience. Line 1102 illustrates the CTR that is better than the average distribution 1101, thus is a good fit. Conversely, line 1103 illustrates a poor fit having a lower CTR.

The third assumption is that the more impressions served on a placement for a line item, the more certain it becomes about its distribution (i.e., the variance decreases). Referring to FIG. 11, line 1103 has a lower variance than line 1101 or 1102 because more impressions are served and its performance is better known. The recommender system better determines the performance of an advertisement on a particular placement as more impressions are served, therefore advertisement performance can be predicted fairly accurately on that placement.

According to one embodiment, the present recommender system provides performance scores for advertisement placements based on their confidence level. The higher the confidence is, the higher the score in placing the ad. The higher scored advertisement placements are weighted more than lower scored advertisement placements in the present recommender system. In one embodiment, as more impressions are served, the scores of the advertisement placements that are served are adjusted and updated accordingly based on the following five models.

1. Collaborative Filtering Model

The present recommender system employs a collaborative filtering and matrix factorization model. Advertisement placements that are better known (scored higher) about their performance are used in collaborative filtering and matrix factorization models. According to one embodiment, CTR (or other feedback parameters) is used as the score/rating to predict. In the collaborative filtering and matrix factorization model, advertisement campaigns are treated as users with a set of unknown preferences/tastes. Advertisement placements are considered as a set of items with one or more attributes that users have tastes for. Given this setup, a recommendation model is applied with a user-based, item-based collaborative filtering and matrix factorization. It is noted that a collaborative filtering and matrix factorization techniques that are user-based, item-based are not fully discussed herein because they are known to be standard mathematical techniques.

It is noted that this recommendation model does not function the same as in other uses. A typical recommendation model is built under the premise that the rating of items by users is already known. In the present recommendation model, the user's rating is estimated as a feedback parameter such as CTR. The fewer impressions are available for an advertisement placement, the less accurate the estimated rating is. Generally, it is desirable to have placements with a large number of impressions (e.g., 500) on multiple campaigns (i.e., at least 5 different campaigns). Having enough impressions on multiple campaigns are important to ensure an accurate estimate of the true CTR with a low variance.

In reality, 500 impressions are a long way away from having an accurate CTR estimate given typical low rates (e.g., 0.1%). Therefore, conventional recommendation models do not perform very well when the estimation is made to the user's rating. The present recommender model estimates the certainty of the observed CTR being the true CTR by assuming that the feedback parameter exhibits an estimable distribution such as Beta distribution. According to one embodiment, the present recommender model estimates the certainty of the observed CTR by referring to the variance of the Beta distribution at the observed CTR. It is understood that other distribution or weighting methods are possible without deviating the scope of the present subject matter. The present recommender model gives weights to the strength of each user's rating based on the certainty of it being the truth by learning less from placements with a lower certainty (e.g., few impressions) and more from those with a higher certainty (e.g., more impressions). By allowing weighted information sharing across less informative advertisement placements, more informative results are obtained because more data is used while controlling the noise.

2. Popularity Model

According to one embodiment, the present system and method employs a popularity model. The popularity model relies on the aggregate CTR of placements across different campaigns. Because the popularity model relies on impressions on different campaigns, it provides a more general model than the present recommender models. The popularity model estimates average CTR distribution for all placements across all campaigns.

The popularity model provides a useful insight for placements with impressions that were perceived as useful in the recommender model, but it is still enough information that the average is useful. The system may use an inference around a distribution (e.g., Beta distribution) for the popularity model to decide at what point the CTRs of these placements can be trusted.

3. Related/Learning Model

The related placements data set includes information that a human provides to the recommender system. the human-provided information is used to identify previous campaigns that the system can use as a reference for historical placement performance. In this case, the system uses previously recorded data from older similar campaigns to influence the current campaign. The related placements data becomes useful when advertisement campaigns are repeated or similar related advertisement campaigns are placed. The related placements data are used to identify similar and related advertisement campaigns and exploit the related placements data by relying more on impression history of similar campaigns, thus weighing their ratings more than dissimilar or unrelated campaigns.

4. Speculative-Seen Model

Speculative-seen placements are placements that have not been deemed certain enough to be in popularity model placements. Those impressions that are already spent to learn the CTR of advertisement placements are worth of ruling out as efficient placements to experiment on in order to find new placements that perform well and use them in popularity model placements as fast as possible where they become more useful. Placements get moved out of the speculative group once the system has seen a certain number of impressions from it or they are deemed to be valuable through a hypothesis test or other choice rules.

5. Speculative-Unseen Model

Speculative-unseen placements are those that are known the least. These speculative-unseen placements have never been served on.

According to one embodiment, speculative-unseen placements are filtered for unwanted content. The system is generally more interested in learning about new placements that have high volume. If those new placements of high volume is determined to be good, they contribute more to the system performance. The system also crawls content of unknown sites for certain topics, word/language level, pictures, links, and other contextual features to determine how similar they are to other high performing placements that are already known to the system.

According to another embodiment, the present recommender system determines the next placements to try by comparing the user traffic of unseen placements with known placements that perform well. This way, the recommender system identifies the audience who engages well with a particular advertisement and find more placements that have a similar user base of a good performing placements.

The above five groupings of placement types broadly represent the level of certainty around the underlying CTR (or any rate) of advertisement placements. The present placement recommendation system starts with unseen placements as described in 5 and refines them to higher confidence placements of 1-4 based on their performance and amount of served impressions.

By ranking placements inside each of these groupings, the present recommender system selects any mix of placements for a global ranking of advertisement placements for every campaign. According to one embodiment, a separate piece of the system communicates with the present recommender system and provides information regarding how many placements choose to bid on in each time interval. The recommender system receives the top requested number of placements and sends them to the requesting bidders.

The present recommender system has several other features that are advantages over conventional recommender systems. It is normal for clients to provide the recommender system with multiple advertisements, generally in different sizes. Since these are all works of art that are all different, some advertisements are more appealing to consumers than others. By standardizing the CTR (or any rate) for advertisement placements with campaign averages and comparing expected performance with the achieved performance, the present recommender system estimates which advertisements are more effective. Using this knowledge, the present recommender system adjusts performance estimates by the estimated advertisement efficacy. This method for estimating advertisement efficacy by size may be generalized to any categorical variable. For example, if any particular category of content (such as sports) always outperforms expectations, the recommender system adjusts all performance estimates accordingly.

At times, it is useful to transform the rates that the recommender system tries to predict. For example, rather than predicting CTR, the recommender system tries and predicts the difference between an advertisement placement's CTR and the campaign average CTR. The difference represents a campaign's relative preference for each placement. Similarly, the recommender system estimates the difference between a campaign's preference for one placement and all other campaigns on that one placement. This difference shows how effective this campaign is on that placement relative to other campaigns. The recommender system may compare both differences to give a cleaner view into each campaigns preference for each placement relative to all other campaigns and all other placements.

According to one embodiment, the present recommender system recommends advertisement placements for multiple targets simultaneously. There are two extensions to the present recommender model that allow for simultaneously targeting of multiple events.

The first extension simply decides what percentage of placements should be aimed at each metric and selects the top placements for each target by running the recommender model for each target. The second extension defines some function for creating a new meta-rating that is a combination of all ratings that are targeted and then applies the recommender model as described above to that new rating.

Figure 9:
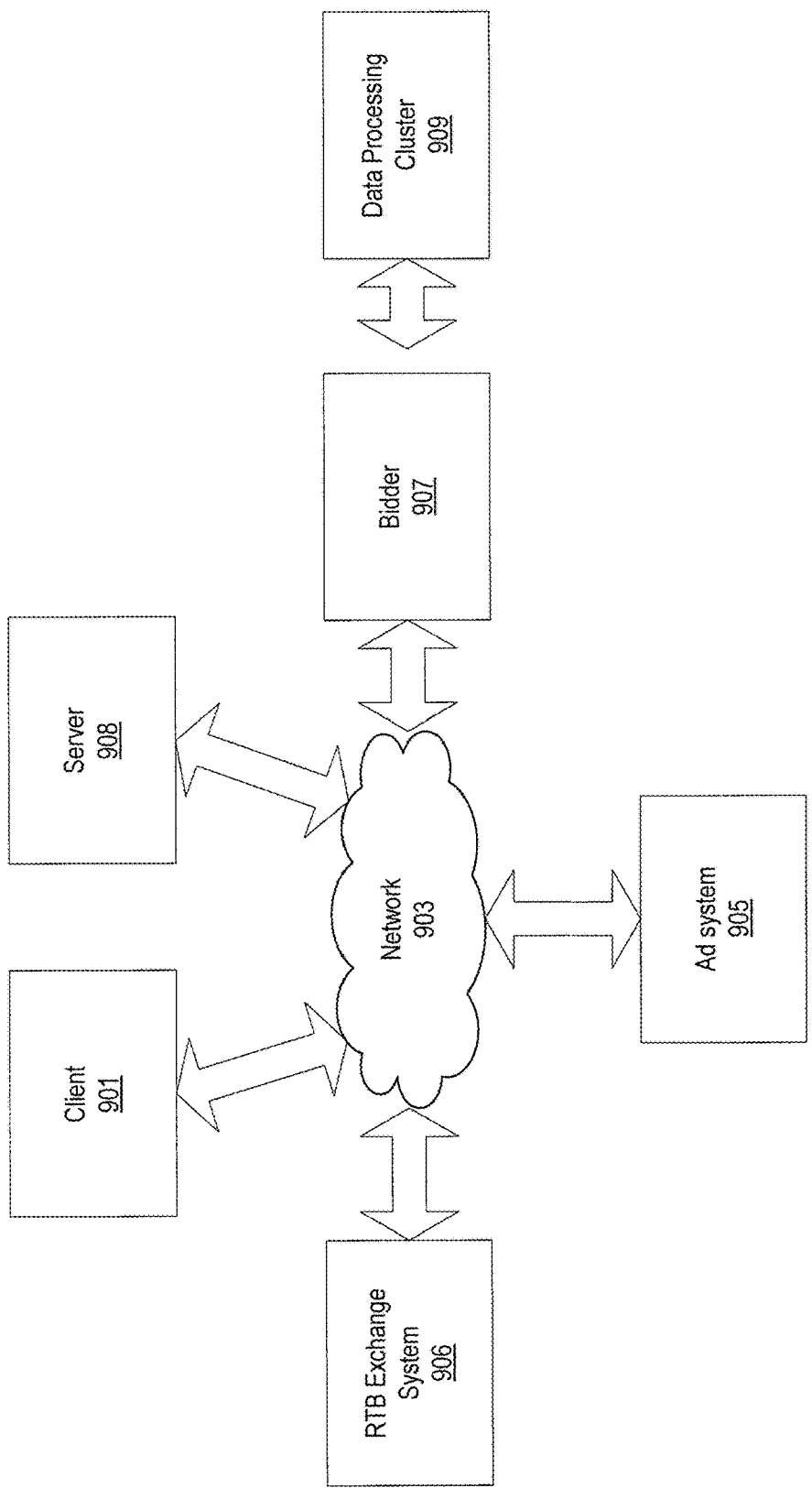
FIG. 9 illustrates an exemplary system level architecture for use with the present system, according to one embodiment.

FIG. 9 illustrates an exemplary system level architecture for use with the present system, according to one embodiment. A client 901 having a browser views a webpage hosted by a server 908. An RTB exchange system 906 receives biddings from one or more bidders 907. Bidders 907 and/or advertisement systems 905 can select an appropriate advertisement and place the selected advertisement to the client 901 on a webpage of the server 908. A data processing cluster 909 processes all data to provide bidding rules for the bidder 907.

Figure 10:
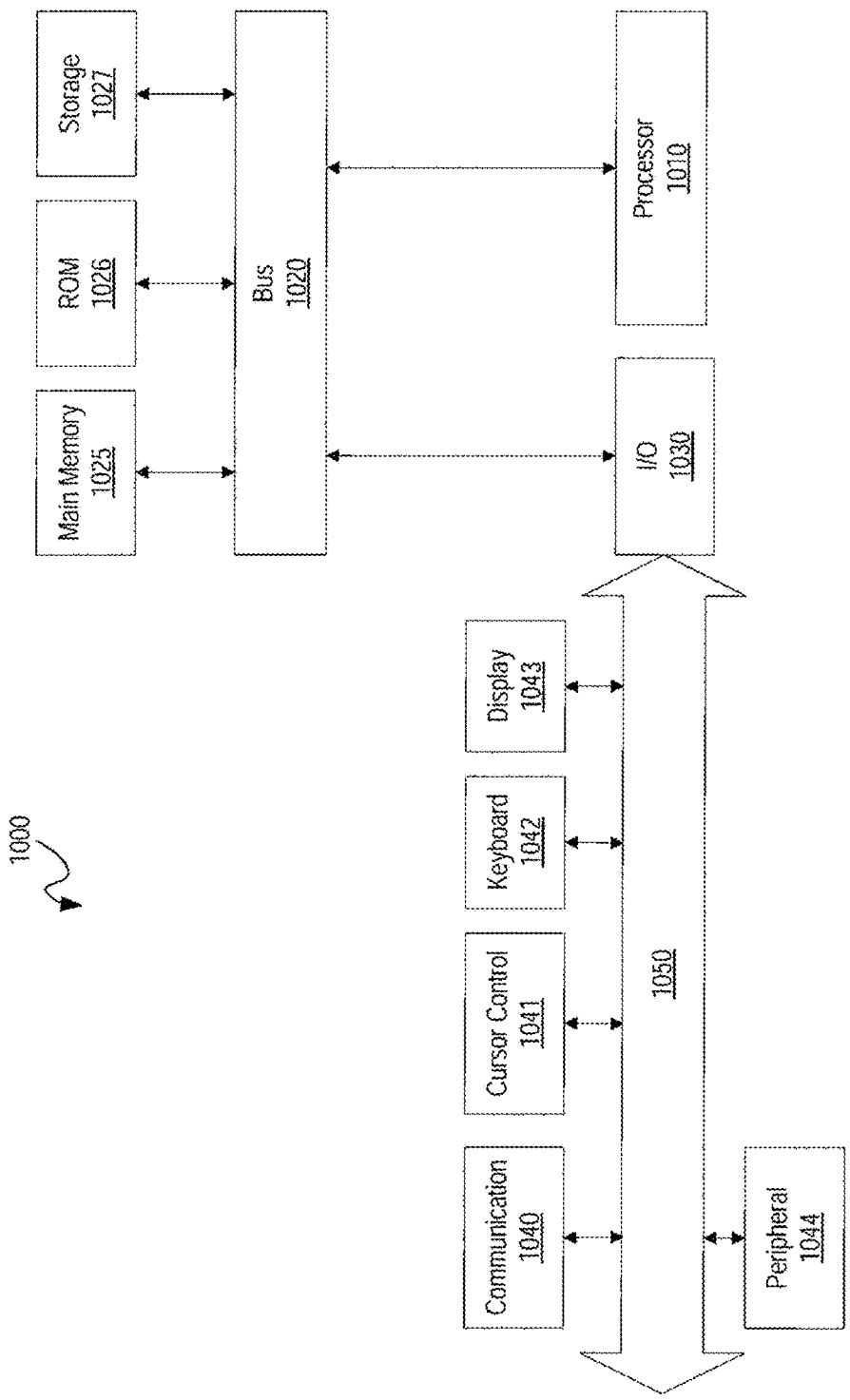
FIG. 10 illustrates an exemplary computer architecture that may be used for the present system, according to one embodiment.

FIG. 10 illustrates an exemplary computer architecture that may be used for the present system, according to one embodiment. The exemplary computer architecture may used for implementing one or more components described in the present disclosure including, but not limited to, the present system. One embodiment of architecture 1000 comprises a system bus 1020 for communicating information, and a processor 1010 coupled to bus 1020 for processing information. Architecture 1000 further comprises a random access memory (RAM) (referred to herein as main memory) or other dynamic storage device 1025, coupled to bus 1020 for storing information and instructions to be executed by processor 1010. Main memory 1025 also may be used for storing temporary variables or other intermediate information during execution of instructions by processor 1010. Architecture 1000 may also include a read only memory (ROM) and/or other static storage device 1026 coupled to bus 1020 for storing static information and instructions used by processor 1010.

A data storage device 1025 such as a magnetic disk or optical disc and its corresponding drive may also be coupled to architecture 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 allows for access to other computers (e.g., servers or clients) via a network. The communication device 1040 may comprise one or more modems, network interface cards, wireless network interfaces or other interface devices, such as those used for coupling to Ethernet, token ring, or other types of networks.

Figure 12:
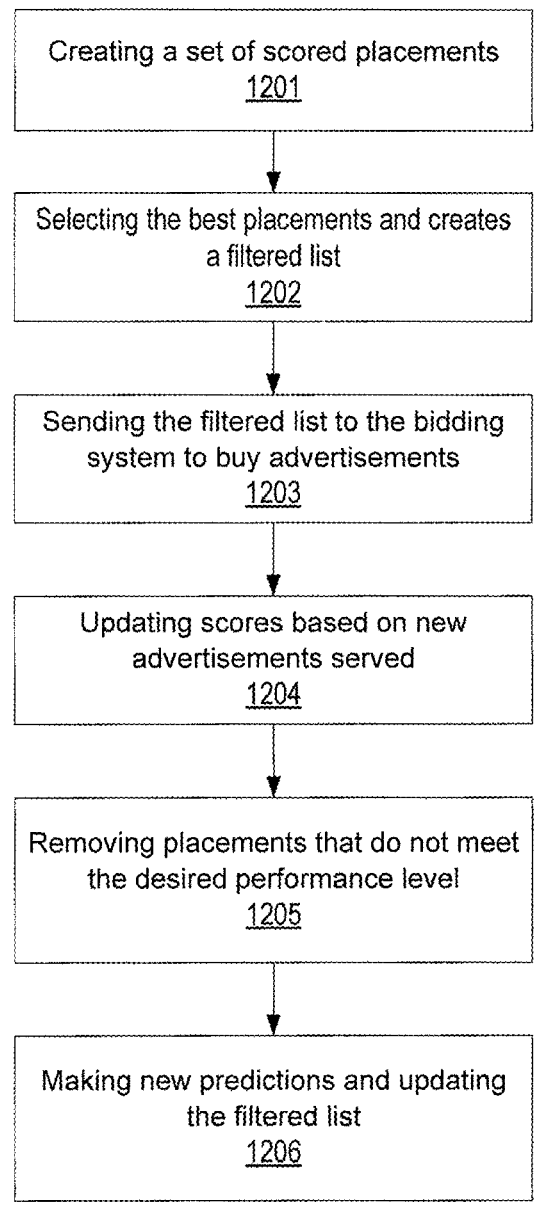
FIG. 12 illustrates a flow-chart of an exemplary process for providing recommendations of advertisement placements, according to one embodiment.

FIG. 12 illustrates a flow-chart of an exemplary process for providing recommendations of advertisement placements, according to one embodiment. The recommender system creates a set of scored placements. In one embodiment, advertisement placements are grouped into different groups, for example, collaborative filtering model, popularity model, related model, speculative seen model, and speculative unseen model. Based on the results of grouping, the system creates a set of scored placements (1201). The system the filters placements based on the expected performance and removes poor performing placements (1202). This filtered list gets sent to the bidding system to purchase impressions (1203). As more impressions are served and more information gathered, individual scores and placement information are updated (1204). Placements not meeting the performance criteria for a campaign are removed, (1205) new predictions are made and the best scoring placements are added to the filtered list (1206). The cycle then repeats.

A system and method for recommending advertisement placements based on scoring and ranking has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method for improving automated real-time bidding for a particular campaign in an online network-based auction system by automatically identifying and prioritizing a group of high-performing online placements from a plurality of online placements, the method comprising:

calculating a similarity measure for each of a plurality of other campaigns, indicating a measure of similarity between each other campaign and the particular campaign, based on a measure of historical performance for each respective campaign with respect to a frequency of target action performance in response to campaign-related impressions delivered via one or more selected online placements;

selecting one or more of the other campaigns based on the calculated similarity measures of the respective campaigns;

scoring, by a bidding system, each of a plurality of online placements by executing a scoring algorithm including:
    submitting a plurality of real-time bids for a particular online placement over time;
    wherein at least a portion of the submitted bids comprise winning bids for which an impression is delivered via the particular online placement to an internet-connected device of a respective user;

monitoring user actions related to impressions delivered via the particular online placement, and generating observed performance data based on the monitored user actions, including determining whether an actual performance of the particular online placement meets a target performance threshold for online placement performance by:
  determining a number of the impressions delivered via the particular online placement;
  determining whether a particular user action is performed in association with each impression delivered via the particular online placement;
  determining an actual number of the user action performances in association with the impressions delivered via the particular online placement;
  accessing confidence level data defining, for the target performance threshold for online placement performance, a mapping between (a) a target number of user action performances and (b) a number of impressions delivered, wherein the target number of user action performances mapped to each reference number of impressions delivered indicates a number of user action performances required to ensure a defined probabilistic likelihood that the number of user action performances meets or exceeds the target performance threshold;
  determining, based on the confidence level data, the target number of user action performances mapped to the actual number of the impressions delivered via the particular online placement, the target number of user action performances indicating the number of user action performances required to provide the defined probabilistic likelihood of meeting or exceeding the target performance threshold;
  comparing the actual number of the user action performances with the target number of user action performances; and
  in response to determining that the actual number of the user action performances meets or exceeds the target number of user action performances, selecting the particular online placement for further use in the particular campaign;
obtaining related-campaign performance data regarding the performance of the particular online placement for the selected one or more other campaigns;
calculating a performance score for the particular online placement based at least on (a) the observed performance data regarding the performance of the particular online placement for the particular campaign and (b) the related-campaign performance data regarding performance of the particular online placement for the one or more other campaigns;
receiving, at the bidding system, from a real-time online bidding exchange via a communications network, a series of bid requests, each identifying an online placement defined in digital content being loaded or rendered by an internet-connected device;
for each received bid request, executing, by the bidding system, an automated real-time bidding algorithm in real-time during the loading or rendering of the respective digital content, the automated real-time bidding algorithm including:
  identifying, based on information contained in the bid request, the respective online placement;
  determining the calculated performance score for the respective online placement;
  determining whether to submit a real-time bid based at least on the calculated performance score for the respective online placement; and
  in response to determining to submit a bid, submitting the bid, including a determined bid price, to the real-time online bidding exchange.

2. The computer-implemented method of claim 1, further comprising:
  grouping a subset of the plurality of online placements based on their performance; and
  calculating the performance score for each of the plurality of online placements based at least on performance scores of other online placements belonging to different groups.

3. The computer-implemented method of claim 2, wherein multiple groups of models selected from the group consisting of a collaborative filtering model, a popularity model, a related model, a speculative seen model, and a speculative unseen model are combined to provide an overall campaign recommendation model.

4. The computer-implemented method of claim 1, further comprising automatically updating the performance scores of the plurality of online placements after delivering additional impressions via the online placements, monitoring additional user actions related to the additional delivered impressions, and generating additional observed performance data based on the monitored additional user actions.

5. The computer-implemented method of claim 1, further comprising comparing user traffic of unseen online placements with the performance of known online placements.

6. The computer-implemented method of claim 1, wherein calculating the performance score for each particular online placement comprises:
  calculating an estimated feedback parameter based at least on (a) the observed performance data and (b) the related-campaign performance data regarding performance of the particular online placement, wherein the estimated feedback parameter is calculated using a variance of an estimable distribution, and
  calculating the performance score for the particular online placement based on the estimated feedback parameter for the particular online placement.

7. The computer-implemented method of claim 6, wherein the estimable distribution is an estimable probability distribution.

8. The computer-implemented method of claim 1, wherein calculating the performance score for each particular online placement comprises:
  determining a click-through-rate (CTR) for the particular online placement based at least on (a) the observed performance data and (b) the related-campaign performance data regarding performance of the particular online placement, and
  calculating the performance score for the particular online placement based on the determined CTR for the particular online placement.

9. A bidding system configured to provide improved automated real-time bidding for a particular campaign in an online network-based auction system by automatically identifying and prioritizing a group of high-performing online placements from a plurality of online placements, the bidding system comprising:
  at least one processor; and
  non-transitory computer readable medium having stored thereon computer-readable instructions, which instructions when executed by the at least one processor cause the at least one processor to:

calculate a similarity measure for each of a plurality of other campaigns, indicating a measure of similarity between each other campaign and the particular campaign, based on a measure of historical performance for each respective campaign with respect to a frequency of target action performance in response to campaign-related impressions delivered via one or more selected online placements;

select one or more of the other campaigns based on the calculated similarity measures of the respective campaigns;

determine whether to select each of a plurality of online placements for use with the particular campaign by executing a placement selection algorithm including:
submitting a plurality of real-time bids for a particular online placement over time;
wherein at least a portion of the submitted bids comprise winning bids for which an impression is delivered via the particular online placement to an internet-connected device of a respective user;
monitoring user actions related to impressions delivered via the particular online placement,
determining a number of the impressions delivered via the particular online placement;
determining whether a particular user action is performed in association with each impression delivered via the particular online placement;
determining an actual number of the user action performances in association with the impressions delivered via the particular online placement;
determining a target number of user action performances based on (a) the actual number of the impressions delivered via the particular online placement and (b) a mathematical function between (i) a number of impressions delivered and (ii) a number of user action performances required to ensure a defined probabilistic likelihood that the number of user action performances meets or exceeds a predefined target performance level for the particular online placement;
comparing the actual number of the user action performances with the target number of user action performances; and
determining to select the particular online placements for use with the particular campaign in response to determining that the actual number of the user action performances meets or exceeds the target number of user action performances;

receive from a real-time online bidding exchange, via a communications network, a series of bid requests, each bid request identifying an online placement defined in digital content being loaded or rendered by an internet-connected device;

for each received bid request, execute an automated real-time bidding algorithm in real-time during the loading or rendering of the respective digital content, the automated real-time bidding algorithm including:
identifying, based on information contained in the bid request, the respective online placement;
determining whether the respective online placement is selected for the particular campaign;
if the respective online placement is selected for the particular campaign, determining whether to submit a real-time bid based on one or more input variable; and in response to determining to submit a bid, submitting the bid, including a determined bid price, to the real-time online bidding exchange.

10. The bidding system of claim 9, wherein the operations further comprise:
grouping a subset of the plurality of online placements based on their performance; and
calculating the performance score for each of the plurality of online placements based at least on performance scores of other online placements belonging to different groups.

11. The bidding system of claim 10, wherein the different groups include one or more of a collaborative filtering model, a popularity model, a related model, a speculative seen model, or a speculative unseen model.

12. The bidding system of claim 9, wherein the performance score for each of the plurality of online placements is determined based on a determined number of impressions served in association with the respective online placement.

13. The bidding system of claim 9, wherein the computer-readable instructions are further executable to automatically update the performance scores of the plurality of online placements after delivering additional impressions via the online placements, monitoring additional user actions related to the additional delivered impressions, and generating additional observed performance data based on the monitored additional user actions.

14. The bidding system of claim 9, wherein the operations comprise comparing user traffic of unseen online placements with the performance of known online placements.

15. The bidding system of claim 9, wherein calculating the performance score for each particular online placement comprises:
calculating an estimated feedback parameter based at least on (a) the observed performance data and (b) the related-campaign performance data regarding performance of the particular online placement, wherein the estimated feedback parameter is calculated by incorporating a variance of an estimable distribution, and
calculating the performance score for the particular online placement based on the estimated feedback parameter for the particular online placement.

16. The bidding system of claim 9, wherein calculating the performance score for each particular online placement comprises:
determining a click-through-rate (CTR) for the particular online placement based at least on (a) the observed performance data and (b) the related-campaign performance data regarding performance of the particular online placement, and
calculating the performance score for the particular online placement based on the determined CTR for the particular online placement.

17. The computer-implemented method of claim 1, further comprising:
selecting a subset of the plurality of online placements based on the calculated performance scores for the online placements; and
wherein determining whether to submit a real-time bid for a particular bid request based at least on the calculated performance score for the respective online placement comprises determining whether to submit a real-time bid based at least on whether the placement identified in the particular bid request is in the selected subset of online placements.

18. The computer-implemented method of claim 1, wherein determining whether to submit a real-time bid for a particular bid request based at least on the calculated performance score for the respective online placement comprises comparing the performance score for the placement identified in the particular bid request to a defined threshold value, and determining to submit a bid only of the performance score is equal to or greater than the defined threshold value.

19. The computer-implemented method of claim 18, wherein the define threshold value comprises a dynamically adjusted pacing threshold value.

20. The computer-implemented method of claim 1, wherein the particular user action associated with each delivered impressions comprises a user click.

21. The computer-implemented method of claim 1, wherein the mathematical function between (i) the number of user action performances and (ii) the number of impressions delivered comprises a linear function.

22. A computer-implemented method for improving automated real-time bidding for a particular campaign in an online network-based auction system by automatically identifying and prioritizing a group of high-performing online placements from a plurality of online placements, the method comprising:
   identifying, by a bidding system, a plurality of online placements for consideration for used with the particular campaign;
   for each of the plurality of online placements, determining whether to select that online placement for use with the particular campaign by:
      submitting a plurality of real-time bids for a particular online placement over time;
      wherein at least a portion of the submitted bids comprise winning bids for which an impression is delivered via the particular online placement to an internet-connected device of a respective user;
      monitoring user actions related to impressions delivered via the particular online placement,
      determining a number of the impressions delivered via the particular online placement;
      determining whether a particular user action is performed in association with each impression delivered via the particular online placement;
      determining an actual number of the user action performances in association with the impressions delivered via the particular online placement;
      determining a target number of user action performances based on (a) the number of the impressions delivered via the particular online placement and (b) a mathematical function between (i) a number of impressions delivered and (ii) a number of user action performances required to ensure a defined probabilistic likelihood that the number of user action performances meets or exceeds a predefined target performance level for the particular online placement; and
      comparing the actual number of the user action performances with the target number of user action performances; and
      determining to select the particular online placements for use with the particular campaign in response to determining that the actual number of the user action performances meets or exceeds the target number of user action performances;
   receiving, at the bidding system, from a real-time online bidding exchange via a communications network, a series of bid requests, each identifying an online placement defined in digital content being loaded or rendered by an internet-connected device;
   for each received bid request, executing, by the bidding system, an automated real-time bidding algorithm in real-time during the loading or rendering of the respective digital content, the automated real-time bidding algorithm including:
      identifying, based on information contained in the bid request, the respective online placement;
      determining whether the respective online placement is selected for the particular campaign;
      if the respective online placement is selected for the particular campaign, determining whether to submit a real-time bid based on one or more input variable; and
      in response to determining to submit a bid, submitting the bid, including a determined bid price, to the real-time online bidding exchange.

23. A computer-implemented method for improving automated real-time bidding for a particular campaign in an online network-based auction system by automatically identifying and prioritizing a group of high-performing online placements from a plurality of online placements, the method comprising:
   identifying, by a bidding system, a plurality of online placements for consideration for used with the particular campaign;
   for each of the plurality of online placements, determining whether to select that online placement for use with the particular campaign by:
      submitting a plurality of real-time bids for a particular online placement over time;
      wherein at least a portion of the submitted bids comprise winning bids for which an impression is delivered via the particular online placement to an internet-connected device of a respective user;
      monitoring user actions related to impressions delivered via the particular online placement,
      determining a number of the impressions delivered via the particular online placement;
      determining whether a particular user action is performed in association with each impression delivered via the particular online placement;
      determining a number of the user action performances in association with the impressions delivered via the particular online placement;
      determining a confidence level for performance of the particular online placement based on (a) the number of the impressions delivered via the particular online placement, (b) the number of the user action performances, and (c) mathematical functions for each of a plurality of different confidence levels, the mathematical function for each confidence level defining a mathematical relationship between (a) a number of delivered impressions and (b) a number of user action performances required to ensure a defined probabilistic likelihood that the number of user action performances meets or exceeds a predefined target performance level for the particular online placement; and
      determining whether to select the particular online placements for use with the particular campaign based on the determined confidence level for performance of the particular online placement;
   receiving, at the bidding system, from a real-time online bidding exchange via a communications network, a series of bid requests, each identifying an online placement defined in digital content being loaded or rendered by an internet-connected device;

for each received bid request, executing, by the bidding system, an automated real-time bidding algorithm in real-time during the loading or rendering of the respective digital content, the automated real-time bidding algorithm including:

identifying, based on information contained in the bid request, the respective online placement;

determining whether the respective online placement is selected for the particular campaign;

if the respective online placement is selected for the particular campaign, determining whether to submit a real-time bid based on one or more input variable; and in response to determining to submit a bid, submitting the bid, including a determined bid price, to the real-time online bidding exchange.

* * * * *